United States Patent Office 3,031,391
Patented Apr. 24, 1962

3,031,391
UNSATURATED SULFIDES
Rector P. Louthan, Bartlesville, Okla., assignor to Phillips Petroleum Company, a corporation of Delaware
No Drawing. Filed Aug. 4, 1958, Ser. No. 753,098
10 Claims. (Cl. 204—158)

This invention relates to unsaturated sulfides. In one of its aspects the invention relates to the reaction of a mercaptan with a halogenated unsaturated compound while irradiating these compounds with activating rays such as ultraviolet and ionizing rays such as gamma rays, at a temperature maintained in the range 35–250° C. Also, the invention relates to the reaction of hydrogen sulfide with such an unsaturated compound while irradiating with ultraviolet and ionizing rays and maintaining a temperature in said range. Further, the invention relates to the production of an unsaturated sulfide by irradiating at least one of a mercaptan and hydrogen sulfide in the presence of a halogenated unsaturated compound at a temperature in the range 35–250° C.

I have now discovered that when a halogenated unsaturated compound and hydrogen sulfide or a mercaptan or a mixture of both are irradiated by activating rays at a temperature in the range of 35–250° C. that unsaturated sulfides are produced at rapid rates with good yields.

It is an object of this invention to prepare unsaturated sulfides. It is another object of this invention to irradiate a mercaptan and/or hydrogen sulfide in the presence of a halogenated unsaturated compound in such a manner as to produce unsaturated sulfides.

According to the present invention, an unsaturated sulfide is produced by the reaction of at least one of a mercaptan and hydrogen sulfide with a halogenated unsaturated compound while irradiating with activating rays such as ultraviolet light or gamma rays at a reaction temperature which is maintained in the range of 35–250° C. The reaction takes place at these temperatures at rapid rates with good yields. However, for preferred results, temperatures of at least 50° C., preferably above 75 to 100° C. are now preferred.

In the reaction of the invention the mercaptan or hydrogen sulfide adds to the double bond and hydrogen chloride is evolved. In the absence of activating radiation, the dehydrohalogenation reaction does not appear to occur at appreciable rates.

The reactions involved in the practice of this invention may be illustrated by the following equations wherein a mercaptan (thiol) and hydrogen sulfide, respectively, are reacted with allyl chloride:

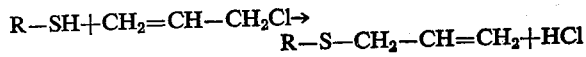
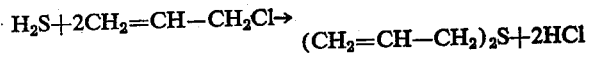

R—SH+CH$_2$=CH—CH$_2$Cl→
    R—S—CH$_2$—CH=CH$_2$+HCl

H$_2$S+2CH$_2$=CH—CH$_2$Cl→
    (CH$_2$=CH—CH$_2$)$_2$S+2HCl

However, it is known that other reactions can occur and other products can be formed.

Thus, also according to the invention, a reaction mass containing unsaturated sulfides and other products is produced by reaction of at least one of a mercaptan and hydrogen sulfide with a halogenated unsaturated compound while irradiating with activating rays such as ultraviolet or gamma rays at a temperature in the range 35–250° C. This reaction mass, from which the unsaturated sulfides can be obtained, forms an important part of the invention.

The hydrogen sulfide can be derived from any convenient source, such as that obtained as by-product from petroleum refining processes and from natural gasoline treating plants. The thiols contain from 1 to 20 carbon atoms, more preferably from 3 to 16 carbon atoms and are preferably aliphatic and acyclic thiols having but one —SH group. One or more of these compounds can be employed simultaneously and particularly for the higher members, the compounds can represent a mixture of isomers. Examples of these thiols include:

Methyl thiol
Ethyl thiol
n-Propyl thiol
Isopropyl thiol
n-Butyl thiol
Secondary butyl thiol
Tertiary butyl thiol
Octyl thiol
Dodecyl thiol
Heptadecyl thiol
Eicosanyl thiol
Vinyl thiol
2-propenyl thiol
3-hexenyl thiol
4-octenyl thiol
3-octenyl thiol
2,4,6-triethyloctyl thiol
2-cyclohexenyl thiol
3-cyclohexenyl thiol
4-cyclooctenyl thiol These thiols, their homologues and analogues, illustrate the thiols which are employed in the practice of this invention, which is that of the reaction as set forth and herein described.

The halogenated compounds which are employed are monoolefins having 2 to 20 carbon atoms in the molecule. The halogen, which is selected from the group chlorine, bromine and iodine, is attached to a carbon atom which is attached to an adjacent carbon atom by an ethylenic linkage or to a saturated carbon atom which is attached to a carbon atom having at least one hydrogen atom attached thereto. Thus, the applicable halogenated compounds can be illustrated by compounds having the groups

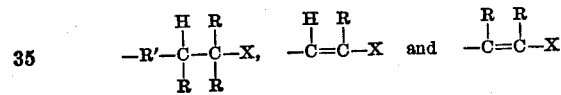

wherein R can be hydrogen, alkyl, and cycloalkyl, R′ is a group containing an olefinic linkage, and wherein X can be one of chlorine, bromine, and iodine. Any two R groups can also represent carbon atoms in a ring structure. The intermediate compound, formed in the reaction of the invention, in order to undergo dehydrohalogenation, must contain the structural group:

That is, there must be a hydrogen atom adjacent to the carbon atom which is attached to the carbon atom to which the halogen is attached.

As earlier indicated, the addition of the hydrogen sulfide or the mercaptan to the double bond must occur, according to the present understanding of the reaction of the invention.

Examples of the halogenated, unsaturated compounds used in the reaction of the invention are:

Vinyl chloride
Allyl chloride
Methallyl chloride
1-chlorobutene-1
1-chlorobutene-2
1-chloro-3-methylbutene-1
3-chlorohexene
4-chlorohexene
1-chloro-5-methylhexene-3
3-(chloromethylene)heptane
1-chloro-decene-1
12-chloro-dodecene-1
1-chlorodecene-5
1-chloro-4-ethyl-7-methyl-nonene-3
2-chloro-6,12-diethylhexadecene-8

1-chlorooctadecene-1
18-chlorooctadecene-1
18-chloro-2,3-dimethyloctadecene-1
16-chlorohexadecene-1
1-chlorocyclohexene
(α-Chlorovinyl)cyclohexane
(β-Chlorovinyl)cyclohexane
(β-Chlorovinyl)cyclohexene-3
(β-Chlorovinyl)cyclohexene-2
(β-Chlorovinyl)benzene
(β-Chlorovinyl)2,4,6-triethylbenzene
Corresponding bromine and iodine compounds Examples of products which are produced by the dehydrohalogenation reaction conducted as herein disclosed include the following:

Diallyl sulfide
Methyl allyl sulfide
Ethyl allyl sulfide
n-Propyl allyl sulfide
n-Octyl allyl sulfide
n-Octyl vinyl sulfide
2-methyl-2-propenyl n-octyl sulfide
2-methyl-2-propenyl tert-octyl sulfide
Di(2-methyl-2-propenyl) sulfide
2-cyclohexylvinyl ethyl sulfide
2,4,6-triethyloctyl 2-butenyl sulfide
4-octenyl n-octyl sulfide
4-cyclooctenyl octadecenyl-1 sulfide
Eicosanyl decenyl-1 sulfide
Di(octenyl-1) sulfide The reaction between the hydrogen sulfide or the thiol and the halogenated unsaturated compound can be effected in the vapor phase, the liquid phase or in a two-phase vapor-liquid system. Batch or continuous operation can be employed. Generally, liquid phase reaction is preferred since such reactions are more easily performed. To effect dehydrohalogenation, the temperature of the reaction mixture is maintained in the approximate range of 35 to 250° C., more preferably 100 to 225° C., while maintaining the pressure sufficient to maintain the reactants substantially in the liquid phase. Since the reactions are exothermic, it is usual to provide for cooling as well as for heating the reaction mixture. With such an arrangement, the temperature can be controlled. It is sometimes convenient to start the reaction at a low temperature within the range specified and then to gradually increase the temperature. Particularly for continuous operation but also for batch operation, the reaction can be completed rapidly within 1 to 30 minutes. In other cases, reaction periods of about 0.5 to 24 hours will be desired to achieve best conversion. Diluents can be employed, if desired. The diluents or solvents which I prefer are the paraffinic compounds having 4 to 16 carbon atoms such as the butanes, pentanes, hexanes, octanes, decanes, and hexadecanes. I prefer these diluents because in them I can best catalyze the reaction by use of ultraviolet and ionizing rays such as gamma rays. A diluent preferably is selected which has a boiling point at least 5° C. higher or lower than the product which is to be recovered. This simplifies separation of the product from the diluent by distillation. However, the product can be recovered by crystallization, by extraction and other means.

Since according to the invention the mixture of products formed under the conditions of the reaction is valuable as insect combatting agents, I can also use a solvent which facilitates application of the mixture of the reaction products by spraying, brushing, and even dusting. For example, if a low boiling solvent such as hexane is used, the reaction mixture can be used as a spray or the reaction mixture can be used to wet a powdered clay. By evaporation of the solvent from the clay-containing mixture a suitable dust is formed. The sulfides, each of them separately, are also useful in combatting insects. Also, the sulfides prepared according to the present invention are useful in the preparation of sulfoxides as described and claimed in copending application Serial No. 753,188, filed August 5, 1958, by Lyle D. Goodhue, Rector P. Louthan and Kenneth E. Cantrel. The said sulfoxides possess superior insect combatting properties as described in said application.

To effect reaction of the mercaptan or hydrogen sulfide with the unsaturated compound and to bring about the dehydrohalogenation reaction, the said reactions taking place in the reaction mass in the vessel substantially at the same time, the reaction mixture is exposed to activating rays. Ultraviolet light rays having a wave length in the range of 100 to 3,800 angstroms (i.e., longer than X-rays and shorter than visible light rays) have been found to be very satisfactory. Various lamps are commercially available which can provide ultraviolet rays. The reaction is also catalyzed by ionizing rays such as X-rays, beta rays and gamma rays. These rays vary in wave length from about 0.010 angstrom up to the ultraviolet region. (See, for example, Handbook of Chemistry and Physics, 30th ed., page 2071, 1947.) X-rays can be generated by the well-known X-ray tubes. Gamma rays and the like are readily obtained from radioactive materials such as cobalt-60 and spent nuclear fuels. In the absence of such activating rays the dehydrohalogenation reaction does not occur at an appreciable rate. For example, the compounds which are the reactants of this invention do not react at an appreciable rate when contacted with each other in a closed vessel which is opaque to activating radiation. Furthermore, the chlorinated, saturated sulfides are compounds which can be heated to elevated temperatures, in the absence of activating rays, without any significant evolution of hydrogen chloride. For example, the 3-chloro-2-methylpropyl n-octyl sulfide has been heated to as high as 224° C. during distillation in Pyrex and therefore in the absence of activating rays without any significant amount of decomposition. Thus, for the dehydrohalogenation reaction of this invention to occur at practical rates, the reactants must be contacted in the presence of activating rays at temperatures at least as high as 35° C. and preferably between 35 and 250° C.

The reaction is preferably effected in corrosion resistant equipment such as glass or ceramic lined steel. The source of the activating rays can be inserted in the reactor so as to effectively utilize the rays. For example, a quartz tube comprising the ultraviolet light can be inserted axially in a tubular reactor.

EXAMPLE I

*Preparation of 2-Methyl-2-Propenyl n-Octyl Sulfide*

A continuous Raab extractor was equipped with a 100 watt mercury vapor lamp so that the lamp would be immersed during operation of the extractor. This extractor was inserted in one arm of one liter size vessel. The vessel was charged with 1 gram mol of n-octyl mercaptan and 1.1 gram mols of methallyl chloride. These reactants were heated for a one-hour period so as to effect refluxing with the condensate circulating through the continuous extractor while the mercury vapor lamp was energized. During the reaction period the temperature increased gradually from 172 to 240° C. The reaction mixture was then distilled. The cuts boiling at temperatures of 152 to 159° C. at 30 millimeters of mercury pressure had an index of refraction, $n_D^{20}$, between 1.4710 and 1.4730. These cuts weighed 49.7 grams. One of these cuts having a boiling point at 153° C. at 30 millimeters' mercury pressure and an index of refraction of 1.4712 was analyzed. The results are compared below with those calculated for 2-methyl-2-propenyl n-octyl sulfide.

|  | Calculated | Found |
|---|---|---|
| Carbon | 72.0 | 72.0 |
| Hydrogen | 12.0 | 12.1 |
| Sulfur | 16.0 | 16.1 |

EXAMPLE II

*Preparation of 2-Methyl-2-Propenyl n-Octyl Sulfide*

The procedure used was substantially the same as described in Example I, except that 2.0 mols of n-octyl mercaptan and 2.2 mols of methallyl chloride were charged to the reactor. The reaction mixture was refluxed for four hours during which the pot temperature rose from about 110 to 210° C. During the reaction period 50 cc. of methallyl chloride was added in two increments (25 cc. each) to replace material which was lost due to bumping in the reactor.

Distillation of the reaction mixture gave approximately 43 grams of 2-methyl-2-propenyl n-octyl sulfide. This product boiled at a temperature of about 127° C. at a pressure of about 9 millimeter mercury and had a refractive index, $n_D^{20}$, of 1.4705.

EXAMPLE III

A run was made using the same charge and procedure as described in Example II except that metallyl chloride was added dropwise to the refluxing mercaptan over a two-hour period after which refluxing was continued an additional 15 minutes. By so operating 77 grams of 2-methyl-2-propenyl n-octyl sulfide was obtained as compared to 43 grams obtained by the procedure of Example II. Also, in addition to the 2-methyl-2-propenyl n-octyl sulfide, unreacted methallyl chloride, unreacted n-octyl mercaptan, and 3-chloro-2-methylpropyl n-octyl sulfide were recovered from the reaction solutions. Neglecting the amount of methallyl chloride isolated, the amounts of each of the products in Example II and the run described above are summarized below:

|  | Example II | | Example III | |
|---|---|---|---|---|
|  | Gm. | Mols | Gm. | Mols |
| n-octyl mercaptan recovered | 180 | 1.23 | 107 | 0.73 |
| 2-methyl-2-propenyl n-octyl sulfide | 43 | 0.21 | 77 | 0.38 |
| 3 - chloro - 2 - methylpropyl n - octyl sulfide | 110.9 | 0.47 | 151 | 0.64 |
| Ultimate yield [1] total sulfides | 88% | | 80% | |

[1] Percent of mercaptan consumed which is converted to total sulfides. The mercaptan consumed is the mercaptan charged minus the mercaptan recovered.

According to the invention, the products which are included within the scope of this disclosure and the appended claims are similarly prepared.

Reasonable variation and modification are possible within the scope of the foregoing disclosure and the appended claims to the invention, the essence of which is that a reaction between at least one of a mercaptan and hydrogen sulfide with a halogenated unsaturated compound as defined is produced while irradiating these compounds with activating rays in the temperature range of 35–250° C. and that unsaturated sulfides are produced by so doing.

I claim:

1. A process for producing a reaction product which comprises irradiating a mixture of a halogenated unsaturated compound having a group structure selected from the group consisting of

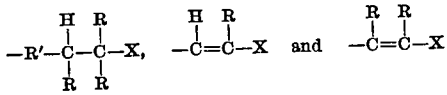

wherein X is selected from the group consisting of chlorine, bromine and iodine, R' is a group containing an olefinic linkage and R is selected from the group consisting of hydrogen, alkyl and cycloalkyl and at least one compound selected from the group consisting of mercaptan and hydrogen sulfide with activating rays having a wave length between about 0.010 and about 3,800 angstroms to a total dosage sufficient to effect appreciable dehydrohalogenation at a temperature in the range 35–250° C.

2. A process for producing a reaction product which comprises irradiating a mixture of a halogenated monoolefinic compound having a group structure selected from the group consisting of

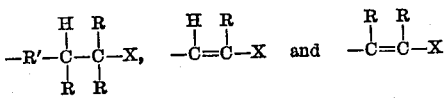

wherein X is selected from the group consisting of chlorine, bromine and iodine, R' is a group containing an olefinic linkage and R is selected from the group consisting of hydrogen, alkyl and cycloalkyl and at least one compound selected from the group consisting of mercaptan and hydrogen sulfide with activating rays having a wave length between about 0.010 and about 3,800 angstroms to a total dosage sufficient to effect appreciable dehydrohalogenation at a temperature maintained above about 50° C.

3. A process for producing a reaction product which comprises irradiating a mixture of a halogenated monoolefinic compound having a group structure selected from the group consisting of

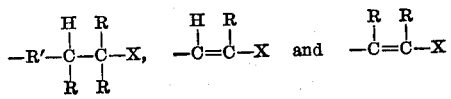

wherein X is selected from the group consisting of chlorine, bromine and iodine, R' is a group containing an olefinic linkage and R is selected from the group consisting of hydrogen, alkyl and cycloalkyl and at least one compound selected from the group consisting of mercaptan and hydrogen sulfide with activating rays having a wave length between about 0.010 and about 3,800 angstroms to a total dosage sufficient to effect appreciable dehydrohalogenation at a temperature maintained above 75–100° C.

4. A process for the production of a reaction product from a halogenated unsaturated monoolefinic compound having a group structure selected from the group consisting of

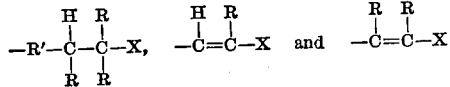

wherein X is selected from the group consisting of chlorine, bromine and iodine, R' is a group containing an olefinic linkage and R is selected from the group consisting of hydrogen, alkyl and cycloalkyl and at least one compound selected from the group consisting of mercaptan and hydrogen sulfide which comprises dissolving the reactant in a diluent transmitting activating rays having a wave length between about 0.010 and about 3,800 angstroms and irradiating the solution thus formed to a total dasage sufficient to effect appreciable dehydrohalogenation at a temperature maintained in the range 35–250° C.

5. A process according to claim 4 wherein the diluent is a paraffinic compound having 4–16 carbon atoms to the molecule.

6. A process for the preparation of a reaction mass comprising an unsaturated sulfide which comprises irradiating with high energy ionizing rays having a wave length between about 0.010 and about 100 angstroms at least one compound selected from the group consisting of mercaptan and hydrogen sulfide together with a halogenated unsaturated monoolefinic compound having a group structure selected from the group consisting of

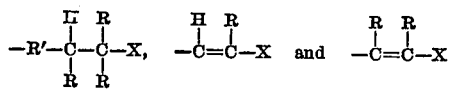

wherein X is selected from the group consisting of chlorine, bromine and iodine, R' is a group containing an olefinic linkage and R is selected from the group consisting of hydrogen, alkyl and cycloalkyl while maintaining the reactants under refluxing conditions at a temperature in the range 35–250° C.

7. A process for producing a reaction mass comprising an unsaturated sulfide which comprises gradually adding to a mercaptan substantially at its boiling point a halogenated unsaturated compound having a group structure selected from the group consisting of

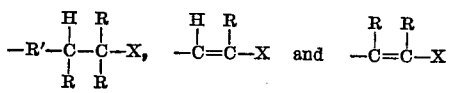

wherein X is selected from the group consisting of chlorine, bromine and iodine, R' is a group containing an olefinic linkage and R is selected from the group consisting of hydrogen, alkyl and cycloalkyl while irradiating the reaction mass with activating rays having a wave length between about 0.010 and about 3,800 angstroms to a total dosage sufficient to effect appreciable dehydrohalogenation and maintaining the temperature in the range 35–250° C.

8. The preparation of a reaction mass containing an unsaturated sulfide which comprises irradiating with activating rays having a wave length between about 0.010 and about 3,800 angstroms to a total dosage sufficient to effect appreciable dehydrohalogenation a thiol containing from 1 to 20 carbon atoms, inclusive, per molecule with a halogen containing monoolefin compound having a group structure selected from the group consisting of

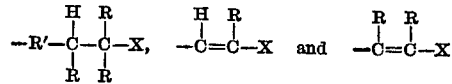

wherein X is selected from the group consisting of chlorine, bromine and iodine, R' is a group containing an olefinic linkage and R is selected from the group consisting of hydrogen, alkyl and cycloalkyl at a temperature of at least about 35° C.

9. A process according to claim 8 wherein the thiol contains 3–16 carbon atoms and is selected from aliphatic and acyclic thiols having one mercapto group.

10. A process for producing a reaction mass comprising an unsaturated sulfide which comprises reacting at least one compound selected from the group consisting of a mercaptan and hydrogen sulfide together with a halogenated unsaturated compound having a group structure selected from the group consisting of

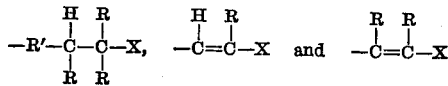

wherein X is selected from the group consisting of chlorine, bromine, and iodine, R' is a group containing an olefinic linkage and R is selected from the group consisting of hydrogen, alkyl, and cycloalkyl while irradiating the reactants with ultraviolet light rays having a wave length in the range of 100–3,800 angstroms to a total dosage sufficient to effect appreciable dehydrohalogenation, and maintaining the temperature in the range of 35–250° C.

References Cited in the file of this patent
UNITED STATES PATENTS

| | | |
|---|---|---|
| 2,392,295 | Rust et al. | Jan. 1, 1946 |
| 2,398,480 | Vaughan et al. | Apr. 16, 1946 |